Feb. 6, 1968        J. M. DONKERS        3,367,500

ORE SEPARATING APPARATUS

Filed July 23, 1965

8499-18

INVENTOR

JACOBUS M. DONKERS

BY *Imrie & Smiley*

ATTORNEYS

United States Patent Office 3,367,500
Patented Feb. 6, 1968

3,367,500
ORE SEPARATING APPARATUS
Jacobus M. Donkers, Amsterdam, Netherlands, assignor to Verschure & Co's Scheepswerf en Machinefabriek N.V., Amsterdam, Netherlands, a Dutch limited-liability company
Filed July 23, 1965, Ser. No. 474,391
Claims priority, application Netherlands, Aug. 4, 1964, 64—8,902
3 Claims. (Cl. 209—456)

ABSTRACT OF THE DISCLOSURE

A series of ore separating tanks connected in series to receive at one end a mixture of ore, sand and water and to discharge at the other end a mixture of sand and water with the ore removed. Each tank defines an elevated gravel bed and a superimposed impervious wall, the latter being flexibly connected to the tank for limited vertical movement to maintain a substantially constant and uniform depth of mixture on the gravel bed and water in each tank is caused to pulsate through the gravel bed as the mixture passes thereover.

---

This invention relates to apparatus for separating ore from a mixture of sand, ore and water, comprising a number of successively disposed tanks containing water, with a gravel bed at the top of each tank and a pulsator for pulsation of the water. With such apparatus the mixture of sand, ore and water flows over the gravel beds of the successive tanks. When the water in each tank is pulsated by the pulsator, the pulsations pass through the gravel bed so that the flowing mixture separates to a certain extent. The heavy ore particles are separated from the lighter sand and sink through the gravel bed into the tank while the sand particles with the water flow on to the next tank. The ore particles still present in the mixture are successively separated in the next tanks.

For proper operation of such apparatus the thickness of the layer of the mixture must have a specific constant value. This requirement makes it difficult to use such apparatus on board a ship in motion. The object of this invention is to provide such apparatus which can be used on a ship in motion without affecting the proper operation of the apparatus.

To this end, according to the invention, a horizontal boundary wall is provided at some distance above the gravel bed, such wall having a certain freedom of movement in the vertical direction. As a result of this boundary wall, the thickness of the layer of mixture is constant while there is nevertheless sufficient freedom of movement for the penetration of the pulsation into the mixture.

In one advantageous embodiment of the invention, the boundary wall is formed by a plank or the like which can float on the mixture flowing over the gravel bed which is contained inside a guiding.

Also, according to the invention, the boundary wall may be connected to the tank side wall by diaphragm-like strips. When the boundary wall is of rigid construction, the required freedom of movement can be obtained together with good sealing at the edges of the boundary wall.

According to the invention, the boundary wall may also be formed by a diaphragm whose edges are connected to the tank walls.

Further features and characteristics of the apparatus according to the invention will be apparent from the following description of one exemplified embodiment with reference to the drawing, wherein.

Figure 1:
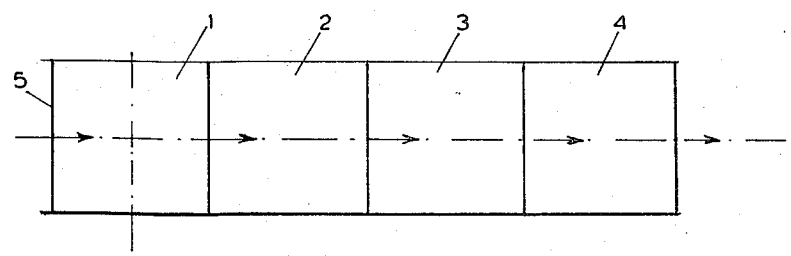
FIG. 1 is a top plan view of the apparatus according to the invention.
Figure 2:
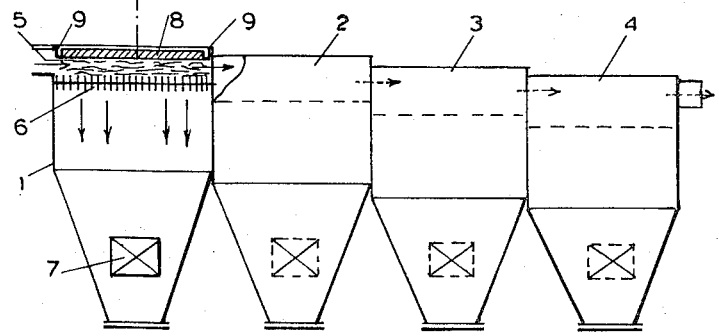
FIG. 2 is a partial cross-section and partial side elevation of the apparatus according to FIG. 1.

As will be apparent from FIGS. 1 and 2, a number of tanks 1, 2, 3 and 4, are disposed in series successively with a natural fall so that a mixture of sand, ore and water supplied at 5 flows successive through the various tanks.

Figure 3:
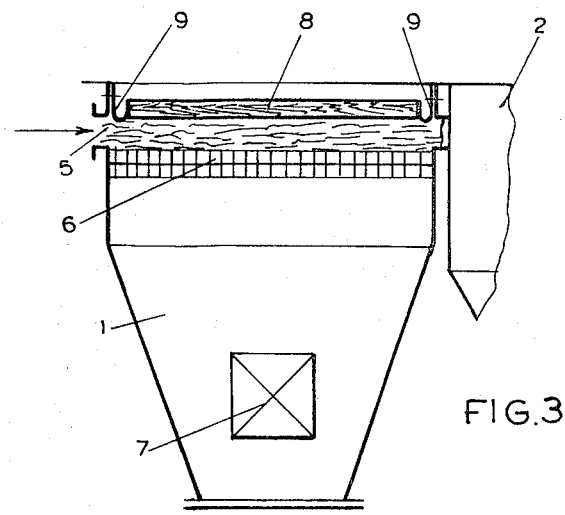
FIG. 3 is a detail of FIG. 2 to an enlarged scale.

As shown to an enlarged scale in FIG. 3, a bed of gravel and suitable support means therefor 6, schematically illustrated, is disposed at the top of the tank 1. A known pulsator 7 is provided at the bottom of the tank 1 to pulsate the water in the tank. When a mixture of sand, ore and water flows slowly over the gravel bed 6, the pulsations are propagated into the flow of mixture so that the mixture constituents separate and the heavier ore particles are separated from the sand and sink in the tank through the graved bed 6. The ore particles can then be removed from the tank subsequently. The unseparated particles entrained in the mixture are successively separated in the following tanks.

For good operation of the apparatus the layer of the mixture of sand, ore and water, must have a uniform thickness. If the apparatus is used on board ship, difficulties are encountered in satisfying this requirement. If, however, according to the invention, a plank 8 is provided at the top of the tank, being secured to the top edge thereof by a rubber diaphragm 9, the thickness remains uniform even in the event of movement of the tank. As a result of the rubber diaphragms 9 the plank 8 has a certain freedom of movement vertically so that the pulsations can penetrate satisfactorily into the layer of mixture.

The plank 8 may alternatively be replaced by a diaphragm whose edges are connected all round to the tank.

What I claim is:

1. Apparatus for separating ore from a mixture of ore, sand and water comprising, in combination,
   a plurality of tanks, each having a closed bottom and an open top, said tanks being disposed in series,
   a horizontal gravel bed in each tank forming a porous partition therein intermediate its top and bottom, and said gravel bed being disposed in successively lower positions in said series of tanks,
   a horizontal impervious partition wall closing the top of each tank in spaced relation above the respective gravel beds therein, said partition walls being flexibly connected to their respective tanks for limited vertical movement relative to their corresponding gravel beds whereby to maintain a substantially constant and uniform depth of mixture passing over each gravel bed,
   means in each tank below a respective gravel bed for pulsation of water within each tank,
   inlet means for each tank for introducing the mixture of ore, sand and water into the region defined between the gravel bed and partition wall at one side of the tank, and outlet means for each tank for discharging the mixture from such region, the outlet means of the tanks being successively connected to the inlet means of the adjacent tanks in the series.

2. Apparatus according to claim 1, wherein the partition wall is formed by a plank or the like which can float on the mixture flowing over the gravel bed and which is contained inside a guiding.

3. Apparatus according to claim 2, wherein the partition wall is connected by diaphragm-like deformable strips to the side wall of the tank.

References Cited

UNITED STATES PATENTS

| | | | |
|---|---|---|---|
| 533,821 | 2/1895 | Montgomery | 209—426 X |
| 923,328 | 6/1909 | Caetani | 209—457 |
| 2,070,069 | 2/1937 | Ruoss | 209—455 |
| 2,125,469 | 8/1938 | Ulrich. | |
| 2,138,810 | 11/1938 | Wood | 209—273 |
| 2,309,275 | 1/1943 | Remer | 209—457 |
| 2,698,686 | 1/1955 | Von Bolhar | 209—457 |

HARRY B. THORNTON, *Primary Examiner.*

TIM R. MILES, *Examiner.*